UNITED STATES PATENT OFFICE.

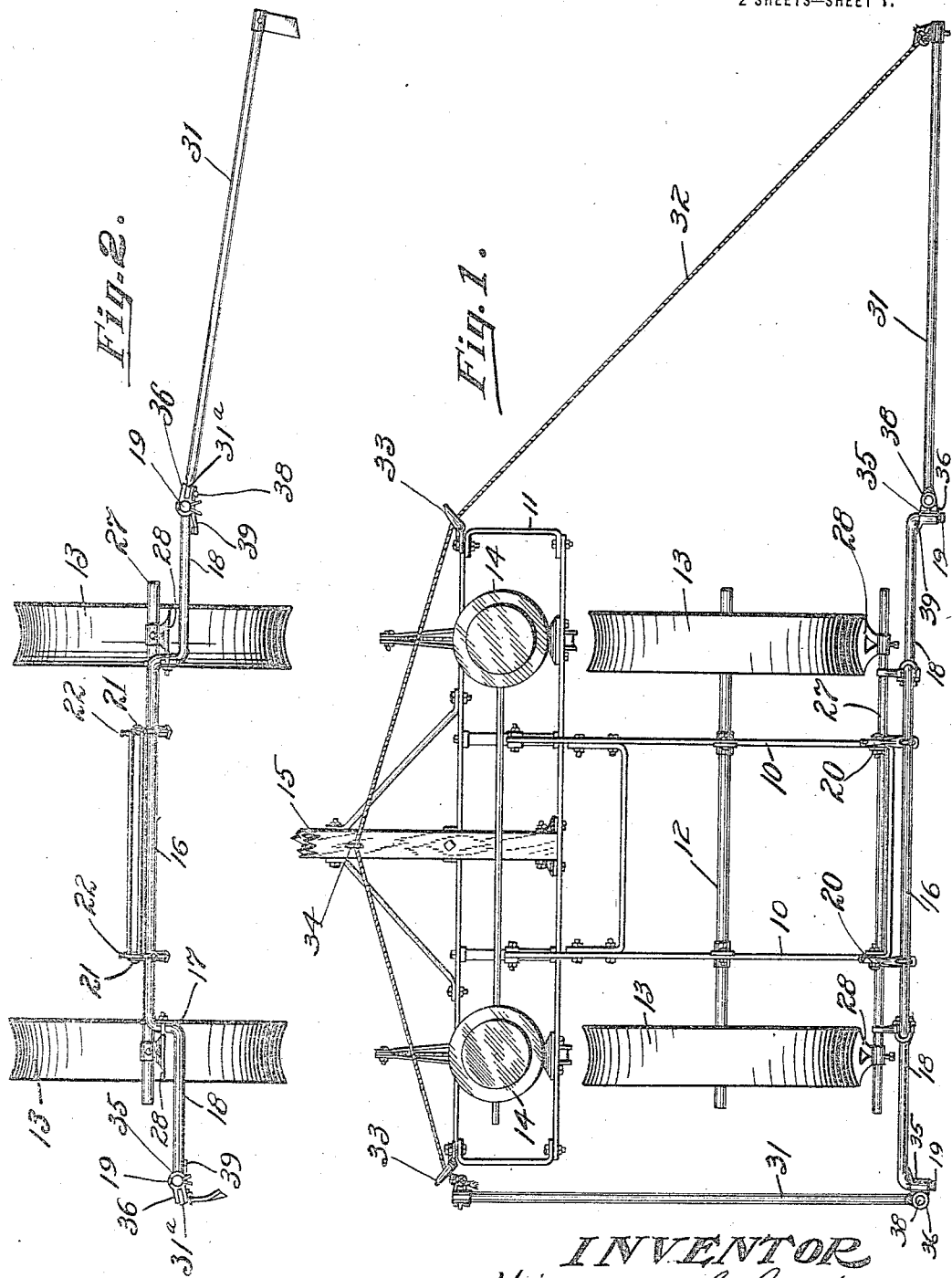

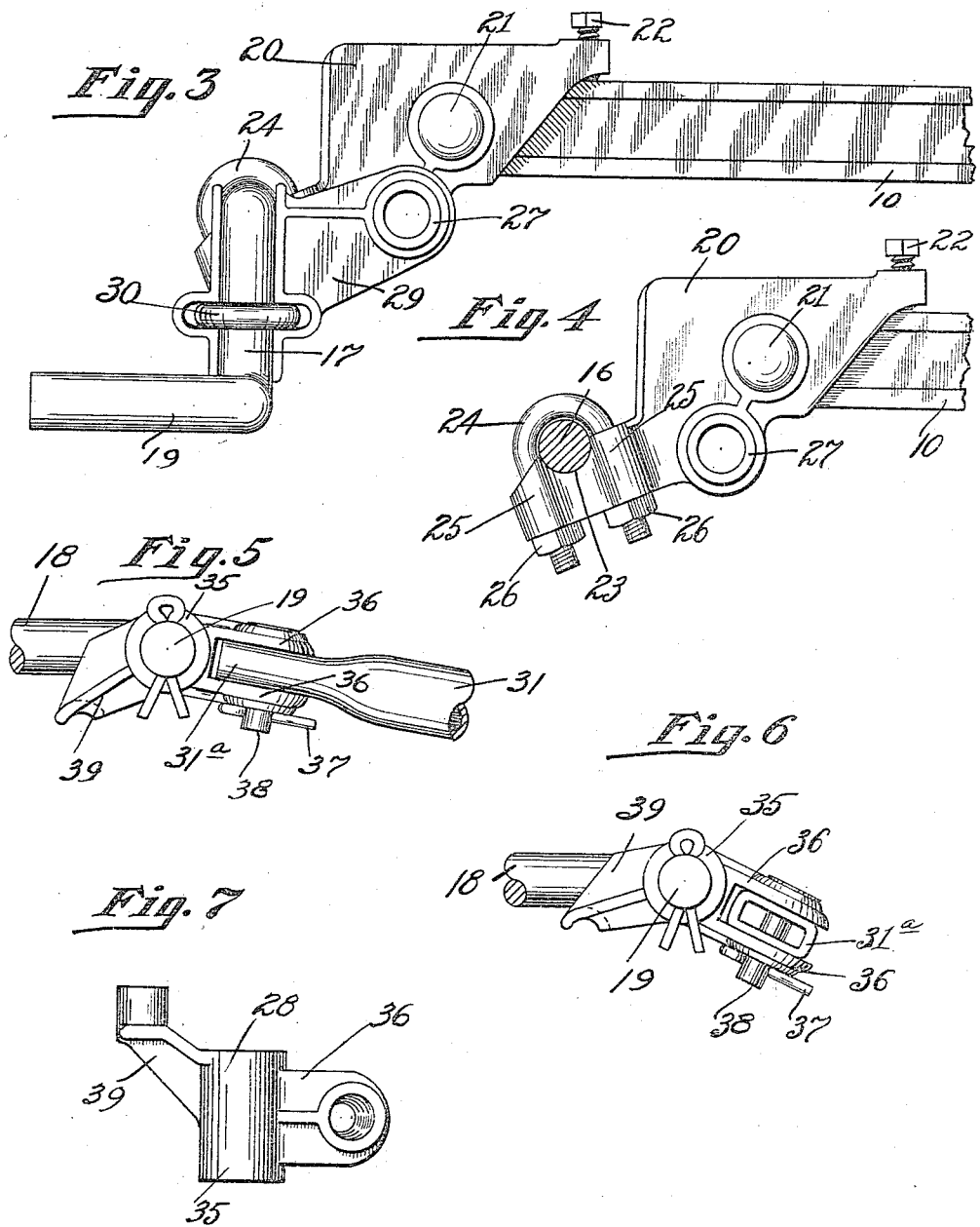

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

LAND-MARKER FOR PLANTERS.

1,267,762.  Specification of Letters Patent.  Patented May 28, 1918.

Application filed March 1, 1918. Serial No. 219,762.

*To all whom it may concern:*

Be it known that I, WILLIAM S. GRAHAM, a citizen of the United States, and a resident of Canton, in the county of Fulton and State of Illinois, have invented certain new and useful Improvements in Land-Markers for Planters, of which the following is a specification, reference being had to the accompanying drawings.

This invention relates to markers adapted to be attached to a planter for marking the earth at one side of and parallel to the line of travel of the planter in order that the mark so made may serve as a guide for the machine on its next trip across the field. More particularly it relates to that type of devices comprising two marker-bars, one pivotally connected at each side of the machine, which bars are connected together at their outer ends by a flexible connection that passes around or through suitable guides at the front of the machine and of such length that one of the marker-bars will be always held alongside of the machine in an inoperative position when the marker-bar at the opposite side is in a laterally-extending and operative position. The invention has for its leading object to provide improved means for connecting these bars to the framework of a planter in such manner that not only can they be moved into and out of operative and inoperative positions with comparative ease but they can be made relatively light in weight, thus diminishing the cost of manufacture.

In the drawings,—

Figure 1 is a plan view of a corn-planter equipped with my improvements;

Fig. 2 is a rear view of the same;

Fig. 3 is a detail, being a side elevation showing a portion of the planter frame and the means for connecting to the frame the coupling-bar to the end portions of which the marker-bars are pivotally attached;

Fig. 4 is a view similar to Fig. 3 but with the end bracket that is shown in said Fig. 3 omitted, and showing the coupling-bar in section;

Fig. 5 is a detail, showing a portion of the coupling bar and a portion of one of the marker-bars and the means for connecting said two parts together, the marker-bar and its connecting means being shown in the position they assume when the marker-bar is in use;

Fig. 6 is a view similar to Fig. 5, but with the parts in the position they occupy when the marker-bar is turned to lie alongside of the machine in inoperative position; and Fig. 7 is a detail of the coupling member shown in Figs. 5 and 6.

Referring to the several figures of the drawings in which corresponding parts are indicated by the same reference characters,— 10 indicates the side bars of the frame of an ordinary corn-planter, and 11 the front frame movably connected thereto as usual. 12 indicates the axle of the machine, and 13 the supporting wheels mounted on said axle. 14 indicates seed hoppers carried by the front frame 11, having at their bottoms the usual seed measuring and discharging devices which will be operated in the ordinary manner, not necessary here to show or describe. 15 indicates the tongue of the machine.

To the rear of the main frame 10 is attached a long bar which I have herein referred to as a "coupling bar" as to it are coupled in the manner hereinafter described the two marker-bars. This coupling bar comprises a central horizontally-disposed body portion 16 which is shown as materially longer than the width of the main frame of the machine. At the ends of such body portion 16 the bar is bent downward at substantially a right angle to the portion 16, such downwardly-extending portions being indicated by 17. The bar is again bent at right angles to form horizontal portions 18 that are shown as lying in the same vertical plane as the body portion 16, and near their ends each of such portions 18 is bent to extend rearwardly and in the same horizontal plane as the portions 18,—these rearwardly-extending portions being indicated by 19. The central or body portion 16 of the coupling bar is connected to the main frame of the planter by two brackets 20 each of which is located against one face of one of the frame-bars 10, each bracket being bolted to its frame-bar by a bolt 21. Each bracket is provided at its upper edge with a lateral flange which overlies the upper edge of the frame-bar 10 to which the bracket is connected, and at some little distance above the upper edge of such frame-bar. Through a screw-threaded opening in this overlying flange passes a set-screw 22 by the turning of which the bracket can be turned slightly on its securing bolt 21 as a pivot for a purpose hereinafter explained. Each bracket has a rearward extension, as best shown in Fig. 4, in the upper edge of which is formed a semi-circular notch 23 in which rests the cylindrical coupling bar member 16. Such coupling bar is firmly clamped in place by a U-bolt 24, the legs of which pass through sockets 25 formed with the said bracket extension, nuts 26 serving to draw the U-bolt tightly down against said coupling bar. In each of the brackets 20 near the lower edge thereof and below the frame members 10 is formed an opening of a size and shape to properly receive and hold a cylindrical scraper-bar 27, said scraper, as shown in Fig. 1, carrying wheel scrapers 28 bolted to it.

29 indicates two other brackets, one being attached to each vertical member 17 of the coupling bar. Each of these brackets 29 has, as best shown in Fig. 3, a curved vertical head to properly receive its member 17, and it is secured to such member 17 by a U-bolt 30 with bolts on the ends thereof similar to the U-bolt construction shown in connection with each bracket 20. Each bracket 29 also comprises a forwardly and upwardly extending arm having a hole in its end through which passes the cylindrical scraper-bar 27. By reason of the coupling bar being secured in place by the two brackets 20 that connect its central body portion 16 with the frame members 10, and also by the two brackets 29 that connect its downwardly-extending members 17 with the scraper-bar 27 such coupling bar is held very securely in place against turning.

The two marker-bars before referred to are each indicated by 31, each of said marker-bars being movably connected to a turned end portion 19 of the coupling bar. The outer ends of the marker-bars have connected to them the ends of a flexible connection 32, as usual in this class of devices, which flexible connection passes through suitable guides 33 secured to the front corners of the front frame 11 of the machine, and also through a guide 34 on the tongue. Each marker-bar is connected to the coupling bar through a coupling that is best shown in Fig. 7, the body portion of which is indicated by 35. This body portion 35 is cylindrical and fits over and turns upon a turned end member 19 of the coupling bar. From one side of the cylindrical member 35 project two ears 36 parallel with each other and spaced a distance apart so as to receive between them the flattened inner end of one of the marker-bars 31. Such flattened end of the marker-bar is indicated by 31ª. The marker-bar is pivotally secured between these ears by a pin 38 having a beveled head to adapt it to be received in a countersunk opening so that it will not project and interfere with the check rower wire when such wire is employed in connection with the operation of the machine, as will usually be the case—although no check rower mechanism is shown in connection with the planter illustrated. The pin is held against withdrawal by a cotter-pin 37.

On the opposite side of the cylindrical part 35 of the coupling projects a short arm 39 which also extends in a forward direction so as to underlie the adjacent member 18 of the coupling bar, the end portion of such arm 39 being so formed as to provide a proper contact piece that, when the marker arm is swung forward into inoperative position as at the left hand side of Fig. 1, will act as a stop and insure such inoperatively-disposed arm being correctly positioned alongside of the machine. When in correct inoperative position the outer end of the marker bar should be directly opposite the adjacent eye 33, and it is to insure it being so located that I provide for the adjustment of the brackets 20 by means of the set screws 22. The provision for such adjustment is a desirable feature as by it compensation can be had for either factory variation or for wear. It will be understood that such adjustment of the brackets need be but very slight as but a little raising or lowering of the coupling bar, which will of course follow the adjustment given to the said brackets, will give ample change in the location of the outer ends of the marker-bars.

By providing for the attachment of the coupling bar to the frame of the machine through the brackets 20 and to the scraper-bar 27 through the brackets 29 that are attached to the vertical members 17 of the coupling bar, I secure a very firm connection of the coupling bar in place and am also able to make such coupling bar of comparatively light material and cylindrical in shape. Making it lighter in weight is an advantage of course, not only from the standpoint of economical manufacture, but it means less weight of material applied to the machine. It is advantageous also to have such coupling bar cylindrical, as thereby a smooth surface is presented over which check rower wire can more freely pass. By the connecting means employed for securing the marker-bars to the ends of the coupling bar, I have provided a construction that enables that one of the marker-arms that is in use to be instantly and easily raised by hand when necessary so as to avoid obstructions that would cause damage to it, and such connection also is of a character that will enable such marker-bar to freely vibrate up and down as the marker carried by it passes over irregular ground surfaces. When one of the marker-bars is drawn forward to position it in its inoperative position alongside of the machine, it turns freely on its pivot 38 and at the same time the cylindrical member 35 of the connecting device turns on its pivot that is furnished by the rearward extension 19 of the coupling bar, such latter turning continuing until stopped by the engagement of the arm 38 with the adjacent horizontal portion 18 of such coupling bar. The two pivotal movements of the marker-arm, viz., that on the pin 38 and the member 19 suffice to bring the forward end of the marker-arm into correct position with respect to the rope guide 33 at that side of the machine, and it will be there retained while the opposite marker-bar is in use.

What I claim as my invention and desire to secure by Letters Patent, is—

1. In a device of the class described, the combination with a planter-frame, of a transversely-arranged bar at the rear of said frame, a bracket connected with said frame and supporting said bar, means for adjusting said bracket to slightly adjust the bar vertically, other means for supporting the bar, and a marker-bar pivotally connected with said first-named bar.

2. In a device of the class described, the combination with a planter-frame, of a transversely-arranged bar at the rear of said frame, a bracket connected by a pivot with said frame and supporting said bar, a vertical set-screw carried by the bracket and engaging the frame for turning the bracket on its pivot to vertically adjust said bar, other means for supporting the bar, and a marker-bar pivotally connected with said first-named bar.

3. In a device of the class described, the combination with a planter-frame, of a transversely-arranged bar at the rear of said frame, said bar comprising a horizontal central section, a downwardly-extending member at each end of said central section and two laterally-extending members, a bracket connecting said central section of the bar with said frame, other brackets clamped to the said downwardly-extending members of the bar and connected with the frame, and a marker-bar pivotally connected with each end of said first-named bar.

4. In a device of the class described, the combination with a planter-frame, of a transversely-arranged bar at the rear of said frame, said bar comprising a horizontal central section, a downwardly-extending member at each end of said central section and two laterally-extending members, a bracket connecting said central section of the bar with said frame, a scraper-bar supported in said bracket and provided with scrapers for the wheels of the machine, other brackets clamped to the said downwardly-extending members of said first-named bar and connected with said scraper-bar, and a marker-bar pivotally connected with each end of said first-named bar.

5. In a device of the class described, the combination with a planter-frame, of a transversely arranged bar at the rear of said frame, said bar being bent to provide a horizontal central section, a downwardly-extending member at each end of said central section, a lateral member extending from each downwardly-extending member and two substantially-horizontal end members, a bracket connecting said central section of the bar with said frame, other brackets clamped to the downwardly-extending members of the bar and connected with the frame, and a marker-bar connected by a universal coupling to each of the said two horizontal end members of said first-named bar.

6. In a device of the class described, the combination with a planter-frame, of a transversely arranged bar at the rear of said frame, said bar being bent to provide a horizontal central section, a downwardly-extending member at each end of said central section, a lateral member extending from each downwardly-extending member and two substantially-horizontal end members, a bracket connecting said central section of the bar with said frame, means for adjusting said bracket to slightly adjust said bar vertically, other brackets clamped to the downwardly-extending members of the bar and connected with the frame, and a marker-bar connected by a universal coupling to each of the said two horizontal end members of said first-named bar.

7. In a device of the class described, the combination with a planter-frame, of a transversely arranged bar at the rear of said frame, said bar being bent to provide a horizontal central section, a downwardly-extending member at each end of said central section, a lateral member extending from each downwardly-extending member and two substantially-horizontal end members, a bracket connecting said central section of the bar with said frame, a scraper-bar supported in said bracket and provided with scrapers for the wheels of the machine, other brackets clamped to the said downwardly-extending members of said first-named bar and connected to said scraper-bar, and a marker-bar connected by a universal coupling to each of the said two horizontal end members of said first-named bar.

8. In a device of the class described, the combination with a planter-frame, of a transversely arranged bar at the rear of said frame, said bar being bent to provide a horizontal central section, a downwardly-extending member at each end of said central section, a lateral member extending from each downwardly-extending member and two substantially-horizontal end members, a bracket connecting said central section of the bar with said frame, other brackets clamped to the downwardly-extending members of the bar and connected with the frame, and a marker-bar connected by a universal coupling to each of the said two horizontal end members of said first-named bar, each coupling comprising a body portion rotatably mounted on one of said end members, and an ear to which a marker-bar is pivoted at an angle to the said end member.

9. In a device of the class described, the combination with a planter-frame, of a transversely arranged bar at the rear of said frame, said bar being bent to provide a horizontal central section, a downwardly-extending member at each end of said central section, a lateral member extending from each downwardly-extending member and two substantially-horizontal end members, a bracket connecting said central section of the bar with said frame, other brackets clamped to the downwardly-extending members of the bar and connected with the frame, and a marker-bar connected by a universal coupling to each of the said two horizontal end members of said first-named bar, each coupling comprising a body portion rotatably mounted on one of said end members, an ear to which a marker-bar is pivoted at an angle to the said end member, and a stop device adapted to contact the adjacent laterally-extending member of the first-named bar when the marker-bar is moved to inoperative position.

10. In a device of the class described, the combination with a planter-frame, of a transversely-arranged bar secured at the rear of said frame, said bar comprising a central horizontal section and end sections lying in a lower plane than said central section, each of said lower end sections having its outer end portion turned at an angle, and a marker-bar pivotally connected by a coupling to each of said turned ends, each coupling comprising a body portion pivoted upon said end member, a laterally-extending ear to which a marker-bar is pivoted at an angle to the said end member, and a stop device adapted to contact the adjacent lower end section of said first-named bar when the marker-bar is moved to inoperative position.

11. In a device of the class described, the combination with a planter-frame, of a transversely-arranged bar secured to the said frame at the rear thereof, an end portion of said bar being turned at an angle to the main or body portion thereof, a marker-bar coupling pivotally mounted on said turned end portion and provided with an ear, and a marker-bar pivoted to said ear at an angle to said turned end portion.

12. In a device of the class described, the combination with a planter-frame, of a transversely-arranged bar secured to the rear of the frame, an end portion of said bar being turned at an angle to the main or body portion thereof and a marker-bar pivotally connected by a coupling to said turned end, such coupling comprising a body portion pivotally mounted upon said turned end, a laterally-extending ear to which the marker-bar is pivoted at an angle to the pivot of the said body portion, and a stop device adapted to contact the bar adjacent to its said turned end when the marker-bar is moved to inoperative position.

WILLIAM S. GRAHAM.

Copies of this patent may be obtained for five cents each, by addressing the "Commissioner of Patents, Washington, D. C."